(12) United States Patent
Iwasa et al.

(10) Patent No.: US 9,702,610 B2
(45) Date of Patent: Jul. 11, 2017

(54) REEFER CONTAINER AND POWER SUPPLY SYSTEM FOR REEFER CONTAINER

(75) Inventors: Koichiro Iwasa, Tokyo (JP); Masanori Nakamura, Takatsuki (JP); Tetsuya Ishi, Tsukuba (JP); Akio Shokaku, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 970 days.

(21) Appl. No.: 13/982,847

(22) PCT Filed: Aug. 22, 2012

(86) PCT No.: PCT/JP2012/071182
§ 371 (c)(1),
(2), (4) Date: Aug. 7, 2013

(87) PCT Pub. No.: WO2013/027761
PCT Pub. Date: Feb. 28, 2013

(65) Prior Publication Data
US 2013/0312450 A1    Nov. 28, 2013

(30) Foreign Application Priority Data

Aug. 22, 2011 (JP) .................................. 2011-180618

(51) Int. Cl.
*F25D 11/00* (2006.01)
*B65D 90/00* (2006.01)
(Continued)

(52) U.S. Cl.
CPC .......... *F25D 11/003* (2013.01); *B65D 88/745* (2013.01); *B65D 90/00* (2013.01);
(Continued)

(58) Field of Classification Search
CPC ...... B65D 88/745; B65D 90/00; F25D 11/003
See application file for complete search history.

(56) References Cited

U.S. PATENT DOCUMENTS

| 8,594,572 B1* | 11/2013 | Ortiz ....................... H02J 5/005 |
| | | 307/104 |
| 2012/0007439 A1* | 1/2012 | Kozakai .................. H02J 5/005 |
| | | 307/104 |

(Continued)

FOREIGN PATENT DOCUMENTS

| JP | S63-139467 | 9/1988 |
| JP | 06-082155 | 3/1994 |

(Continued)

OTHER PUBLICATIONS

Machine Translation of JP8-198383A; Aug. 1996.*
International Search Report issued Oct. 9, 2012 in International (PCT) Application No. PCT/JP2012/071182.

*Primary Examiner* — Jared Fureman
*Assistant Examiner* — Joel Barnett
(74) *Attorney, Agent, or Firm* — Wenderoth, Lind & Ponack, L.L.P.

(57) ABSTRACT

A reefer container includes: a box-shaped container body; a load equipped in the container body; and a power receiving portion which is configured to receive power from an outside and to supply the power to the load. The power receiving portion includes a power receiving coil which is configured to contactlessly receive the power from the outside.

14 Claims, 6 Drawing Sheets

(51) Int. Cl.
  *B65D 88/74* (2006.01)
  *H02J 5/00* (2016.01)
  *H02J 50/10* (2016.01)
  *H01F 38/14* (2006.01)

(52) U.S. Cl.
  CPC ............. *H02J 5/005* (2013.01); *H02J 50/10* (2016.02); *H01F 38/14* (2013.01)

(56) References Cited

U.S. PATENT DOCUMENTS

2012/0248893 A1* 10/2012 Teggatz .................. H01F 38/14
  307/104
2013/0063084 A1* 3/2013 Tilvis ..................... H01F 27/28
  320/108

FOREIGN PATENT DOCUMENTS

| JP | 6-082155 | 3/1994 |
| JP | 8-198383 | 8/1996 |
| JP | 8-198383 A * | 8/1996 |
| JP | 2007-060829 | 3/2007 |
| JP | 2009-240098 | 10/2009 |
| JP | 2011-037573 | 2/2011 |
| JP | 2011-061942 | 3/2011 |
| JP | 2011-205780 | 10/2011 |
| WO | 2009/129900 | 10/2009 |

\* cited by examiner

REEFER CONTAINER AND POWER SUPPLY SYSTEM FOR REEFER CONTAINER

CROSS-REFERENCE TO RELATED APPLICATION

This is the U.S. National Phase Application under 35 U.S.C. §371 of International Patent Application No. PCT/JP2012/071182 filed Aug. 22, 2012, which designated the United States and was published in a language other than English, which claims the benefit of Japanese Patent Application No. 2011-180618, filed on Aug. 22, 2011, both of them are incorporated by reference herein. The International Application was published in Japanese on Feb. 28, 2013, as WO2013/027761 A1 under PCT Article 21(2).

TECHNICAL FIELD

The present invention relates to a reefer container capable of contactlessly supplying power and a power supply system for the reefer container.

BACKGROUND ART

Hitherto, for the sea transport of fresh foods, frozen foods, medicines that require refrigerated transport, works of art, and the like, a reefer container provided with a cooling unit in the container has been widely used. The cooling unit of the reefer container is generally driven by being supplied with power from an external power source installed in a container terminal or a container ship. In addition, in the conventional art, the cooling unit is supplied with power by connecting the external power source to the cooling unit with a power cable (for example, Japanese Unexamined Patent Application, First Publication No. H6-82155 and Japanese Unexamined Patent Application, First Publication No. 2011-37573).

In a refrigeration container described in Japanese Unexamined Patent Application, First Publication No. H6-82155 and Japanese Unexamined Patent Application, First Publication No. 2011-37573, a power plug is disposed in a refrigeration unit, and external power is supplied to the refrigeration unit by connecting a power cable from a power source box installed in a container terminal or a container ship or a power supply apparatus such as a container stand, to the power plug.

PRIOR ART DOCUMENTS

Patent Documents

[Patent Document 1] Japanese Unexamined Patent Application, First Publication No. H6-82155
[Patent Document 2] Japanese Unexamined Patent Application, First Publication No. 2011-37573

DISCLOSURE OF INVENTION

Problems to be Solved by the Invention

However, according to the refrigeration container of the conventional art, in order to supply power from the external power source, the power cable has to be connected to the refrigeration unit. Accordingly, the operation of connecting the power cable to the power plug or the other necessary connection operations are cumbersome, and thus there is a problem in that workload is heavy.

In addition, at the time of the connection operation of the refrigeration container by the power cable, predetermined operations of removing the plug of the power cable, directly connecting an electric wire to a breaker, and the like are necessary. Therefore, for an operation of loading and unloading of the refrigeration container on and from the container ship, the operation connecting or removing the external power source has to be performed approximately 30 minutes before the start of the loading and unloading operation. Therefore, it takes time to perform the operation of connecting the power cable, and thus there is also a problem in that appropriate temperature regulation is difficult during the connection operation.

In addition, the connection of the power cable to the refrigeration container is accompanied with a process that can be performed only by a legal electrician, and thus there is also a problem in that labor costs are increased.

In addition, in a case where the refrigeration containers are stacked on two or more levels in the container terminal or the container ship, the operation of connecting the power cable to the containers at second or higher level is difficult, and thus the refrigeration containers are to be stacked on one level if possible, or up to two levels. Therefore, in a case where the refrigeration containers have to be stacked on a number of levels, the number of levels is limited, and thus there is also a problem in that loading efficiency is poor.

In addition, in a case of the refrigeration container, unlike a dry container, heat is dissipated to the outside of the refrigeration container during driving of the refrigeration unit, and thus it is desirable that the refrigeration container is loaded on a deck of the container ship as a loading place which is not filled with heat. However, since the loading efficiency of the refrigeration container is poor as described above, the refrigeration containers which are not loaded on the deck need to be disposed in a hold. In this case, since the hold is filled with heat, temperature regulation in the hold needs to be performed by an air-conditioner, and there is also a problem in that energy cost is increased during transportation.

The present invention is made taking the foregoing circumstances into consideration, and an object thereof is to provide a reefer container which enables a simple and efficient power supply operation and can be applied to stacking on multiple levels and provide a power supply system for the reefer container.

Means for Solving the Problems

In order to accomplish the object to solve the problems, the present invention employed the following.

(1) A reefer container according to a first aspect of the present invention includes: a box-shaped container body; a load equipped in the container body; and a power receiving portion which is configured to receive power from an outside and to supply the power to the load, in which the power receiving portion includes a power receiving coil which is configured to contactlessly receive the power from the outside.

According to the aspect above, since power from an external power source can be contactlessly received and be supplied to a load (for example, a cooling unit), at the time of an operation of supplying power, an operational process of connecting the external power source to the power receiving portion of the reefer container with a power cable can be omitted. That is, the operation of electrically connecting the external power source can be significantly reduced, and power supply can be simply prepared.

In addition, since the operational process of connecting the external power source to the power receiving portion of the reefer container with the power cable can be omitted, a time for which power supply is stopped due to the operation of connecting the power cable until the power supply is started can be significantly reduced, and labor costs can be reduced.

In addition, since contactless power supply is possible, the power can be easily supplied by stacking the reefer containers on two or more levels. Therefore, the reefer containers can be efficiently stacked on a plurality of levels.

In addition, the reefer containers can be efficiently loaded on the deck of a container ship by being stacked on two or more levels. Therefore, an increase in the temperature in a hold due to the reefer containers stacked on a number of levels in the hold is suppressed, thereby reducing cooling cost.

(2) The reefer container described in (1) may employ a configuration in which the container body includes a rectangular bottom plate, side plates which stand on the bottom plate and surround four sides of the bottom plate, and a top plate which blocks an upper end opening formed by the side plates, and the power receiving portion is provided in the side plate.

In this case, since the power receiving portion is provided in the side plate, in a case where the power supply portion of the external power source is provided in a wall portion of a container yard or a container ship, the reefer containers may be in a state of being supplied with power only by arranging the reefer containers to cause the power receiving portion to oppose the power supply portion. In addition, by stacking the reefer containers on a plurality of levels and causing each of the power receiving portions to oppose the power supply portion of the external power source, the stacked containers can be simultaneously supplied with power.

(3) In the reefer container described in (2), the container body may further include a power supply portion which is configured to supply power received by the container body to the power receiving portion of another adjacent container body when a plurality of the container bodies are arranged to be horizontally adjacent.

In this case, since the power supply portion which supplies the power received by the container body itself to the power receiving portion of the other adjacent container body when the plurality of the container bodies are arranged to be horizontally adjacent, the power received by the container body can be sequentially and simply transmitted in the horizontal direction to the other adjacent reefer container using the reefer container.

(4) The reefer container described in (1) may employ a configuration in which the container body includes a rectangular bottom plate, side plates which stand on the bottom plate and surround four sides of the bottom plate, and a top plate which is disposed at an upper end opening formed by the side plates, and the power receiving portion is provided in the bottom plate.

In this case, since the power receiving portion is provided in the bottom plate, in a case where the power supply portion of the external power source is fixed to the ground surface of a container terminal or the bottom plate of the container ship, the reefer container can be in a state of being supplied with power only by disposing the reefer container to cause the power receiving portion to oppose the power supply portion.

(5) In the reefer container described in (4), the container body may further include a power supply portion which is configured to supply power received by the container body to the power receiving portion of another container body stacked on the container body when a plurality of the container bodies are vertically stacked.

In this case, when the plurality of the container bodies are vertically stacked, the adjacent container body at the lower level includes the power supply portion which supplies power received by the container body to the power receiving portion of the container body stacked thereon at the upper level, the power received by the container body can be sequentially and simply transmitted to the other upper reefer containers using each of the reefer containers only by stacking the reefer containers.

(6) The reefer container described in (1) may employ a configuration in which the container body includes a rectangular lower plate, side plates which stand on the bottom plate and surround four sides of the bottom plate, and a top plate which is disposed at an upper end opening formed by the side plates, and the power receiving portion is provided in both the side plate and the bottom plate.

In this case, according to a fixed position of the power supply portion of the external power source, the power receiving portion can be selectively switched when the power is supplied to the reefer container.

(7) In the reefer container described in (6), the container body may further include a power supply portion which is connected to the power receiving portion at a position that opposes the power receiving portion in both the side plate and the top plate.

In this case, according to the fixed position of the power supply portion of the external power source, the power receiving portion when the power is supplied to the reefer container and the power supply portion provided at the opposing position can be selectively switched.

(8) In the reefer container described in any one of (1) to (7), the power receiving portion may include a power receiving connection portion to which a power cable which is configured to supply the power from the outside is connected.

In this case, since the power receiving portion is provided with the power receiving connection portion to which the power cable which supplies the power can be connected, in addition to the power receiving coil which can contactlessly receive the power, a power receiving method can be selected according to circumstances.

(9) In the reefer container described in any one of (1) to (8), a power supply system of the power receiving portion may be an electromagnetic induction system.

In this case, since the power supply system of the power receiving portion is the electromagnetic induction system, power can be simply supplied with good power efficiency.

(10) In the reefer container described in any one of (1) to (9), a power supply system of the power receiving portion may be a magnetic field resonance system.

In this case, since the power supply system of the power receiving portion is the magnetic field resonance system, the distance between the power receiving coil and the power supply coil can be increased compared to the electromagnetic induction system, and even when the positions of the coils are slightly deviated, the power can be supplied by suppressing power loss. In addition, the power can be contactlessly and simply supplied to the power receiving portion of the separated reefer container.

(11) A power supply system according to an aspect of the present invention includes: the reefer container described in any one of (1) to (10); and a power supply apparatus which is configured to contactlessly supply power to the reefer container.

In this aspect, since the reefer container described in any one of (1) to (10) and the external power supply portion which has a power supply coil that contactlessly supplies power to the reefer container are provided, the operation of electrically connecting the external power source can be significantly reduced, and power supply can be simply prepared, thereby suppressing labor costs for preparing the power supply.

(12) In the power supply system described in (11), a power supply coil of the power supply portion may be formed in a shape of a sheet.

In this case, since the power supply portion is formed in the shape of a sheet, the power supply portion can be easily installed at an arbitrary position with a good efficiency in terms of space.

Effects of the Invention

According to the reefer container according to the aspect described in (1) of the present invention, since power from the external power source can be contactlessly received and be supplied to the load (for example, the cooling unit), the operational process of connecting the external power source to the power receiving portion of the reefer container with the power cable can be omitted. Therefore, the operation of electrically connecting the external power source can be significantly reduced. In addition, for the same reason, power supply can be simply prepared.

In addition, since the operational process of connecting the external power source to the power receiving portion of the reefer container with the power cable can be omitted, a time for which power supply is stopped due to the operation of connecting the cable until the power supply is started can be significantly reduced, and labor costs for connecting the power cable can be reduced.

In addition, since contactless power supply is possible, it is also possible to supply power by stacking the reefer containers on two or more levels. Therefore, the loading efficiency of the reefer containers can be enhanced.

In addition, since the reefer containers can be efficiently loaded on the deck of the container ship by being stacked on two or more levels, an increase in the temperature in the hold due to the reefer containers stacked on a number of levels in the hold is suppressed, thereby reducing cooling cost.

EMBODIMENTS FOR CARRYING OUT THE INVENTION

Hereinafter, an embodiment of a reefer container (hereinafter, simply referred to as "container") of the present invention and a power supply system in a magnetic field resonance system using the same will be described with reference to the drawings. In addition, the power supply system in the magnetic field resonance system is provided with a power supply coil, a power receiving coil, a matching circuit (capacitor), and the like, and realizes contactless power supply (wireless power supply).

Figure 1A:
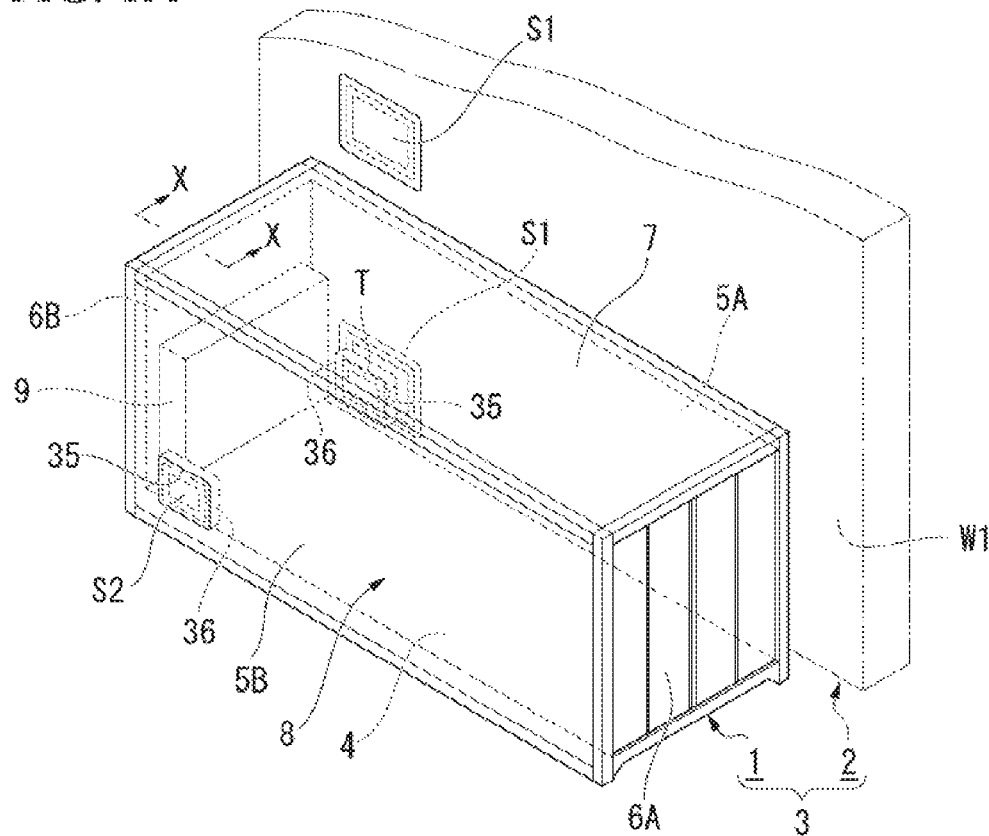
FIG. 1A is a figure of a power supply system according to an embodiment of the present invention and is a perspective view of a reefer container and a power supply apparatus.
Figure 1B:
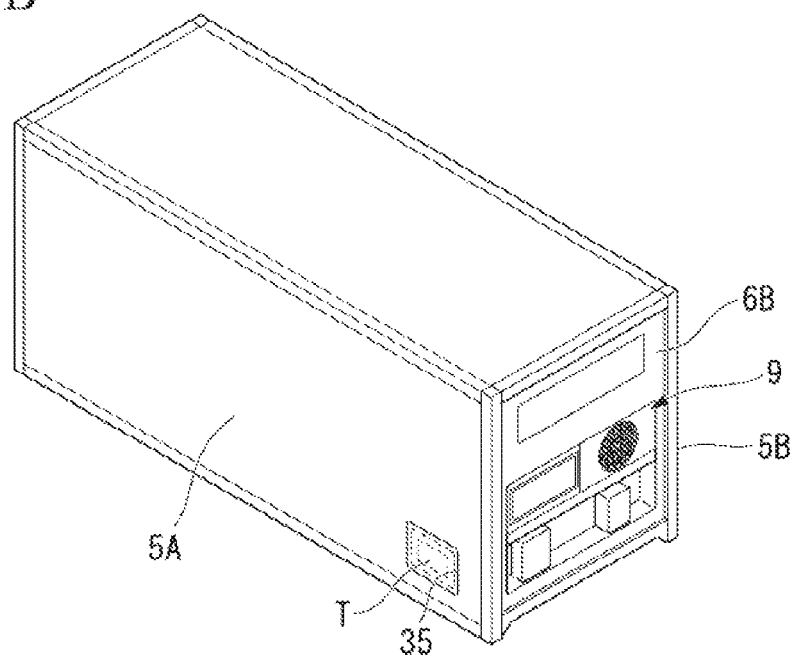
FIG. 1B is a perspective view of the reefer container viewed from the opposite side to FIG. 1A.

FIGS. 1A and 1B are perspective views illustrating a container 1 and a power supply system 3 provided with a power supply apparatus 2 which supplies power to the container 1.

Figure 4:
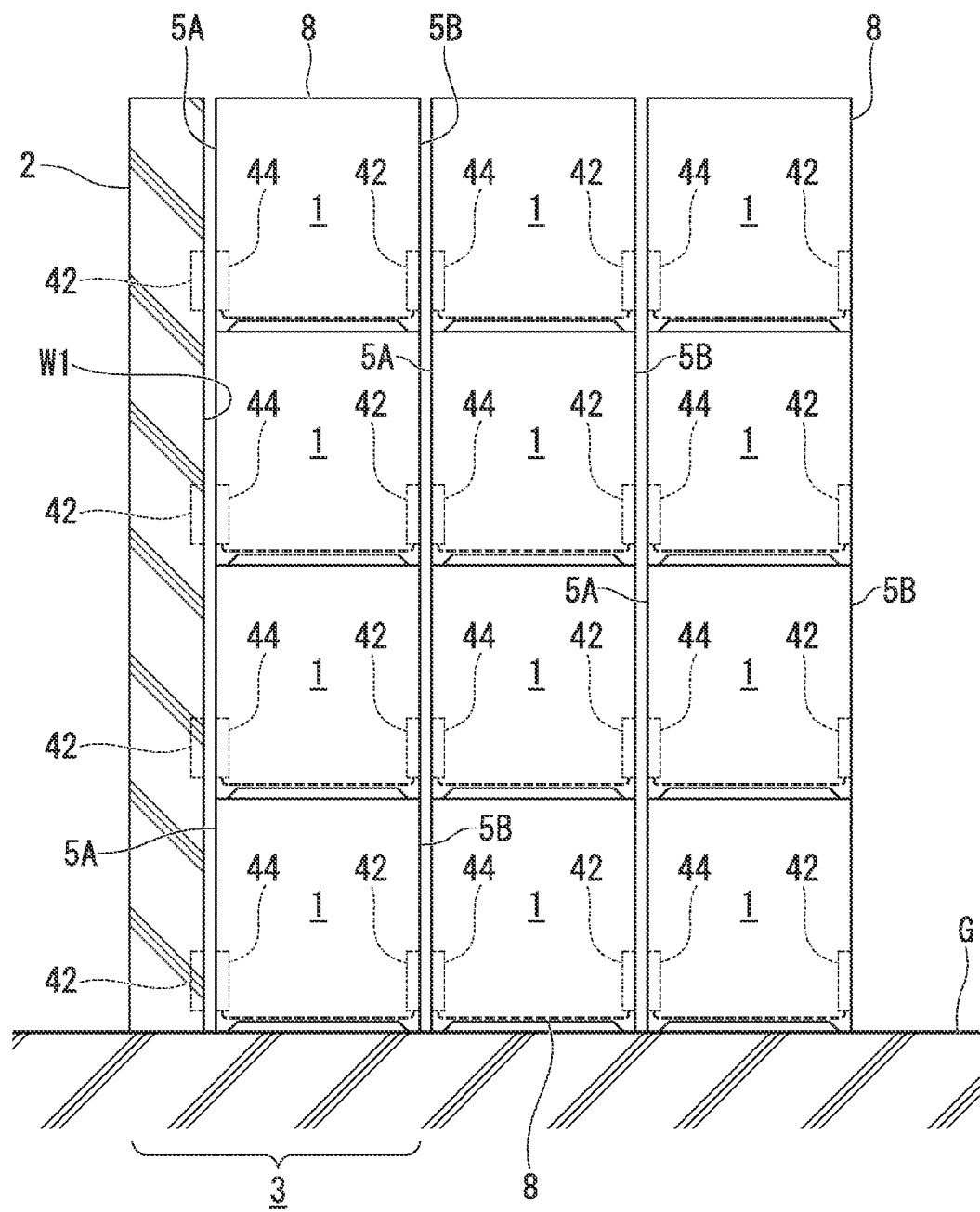
FIG. 4 is a figure of the power supply system and is a side view of the power supply apparatus and the reefer containers stacked.

As illustrated in FIG. 1A, the power supply apparatus 2 is an external power source provided in a wall portion that independently stands on the ground surface in a container terminal, a wall portion in a container ship, or the like, and has a height substantially the same as the height of the containers 1 that are stacked on, for example, four levels. As illustrated in FIG. 4, in the power supply apparatus 2, four power supply coils 42 of the power supply system 3 in the magnetic field resonance system are vertically arranged on a wall surface W1 side that opposes the containers 1 at intervals of the height of the container 1.

The power supply coils 42 are arranged along the wall surface W 1, and constitute a power supply portion S1 illustrated in FIG. 1A together with a capacitor (not shown As illustrated in FIG. 1A, the container 1 includes a container body 8 and a cooling unit 9. The container body 8 includes a rectangular bottom plate 4, a pair of side walls 5A and 5B and a pair of end walls 6A and 6B (side plates) which stand on the four sides of the bottom plate 4 and oppose each other, and a top plate 7 which covers the upper end opening of the four walls formed by the side walls 5A and 5B and end walls 6A and 6B. One end wall 6A forms a door for moving articles to be transported in and out of the container body 8. As illustrated in FIGS. 1B and 2B, the cooling unit 9 is arranged on the end wall 6B side of the container body 8.

As illustrated in FIG. 1A, the bottom plate 4, the side walls 5A and 5B, the end walls 6A and 6B, and the top plate 7 of the container body 8 are formed of a plate material made from a metal material such as iron, stainless steel, and an aluminum alloy, and have a highly-heat-insulated structure having heat insulating materials.

Figure 2A:
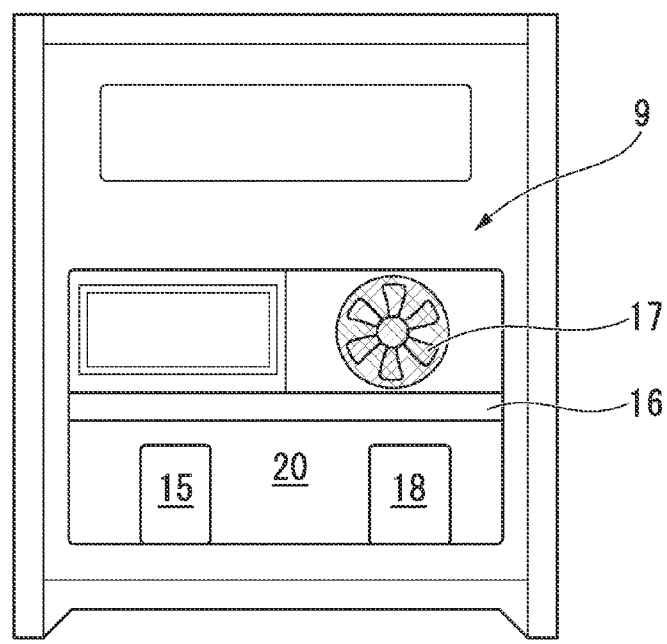
FIG. 2A is a rear elevation view of the reefer container.
Figure 2B:
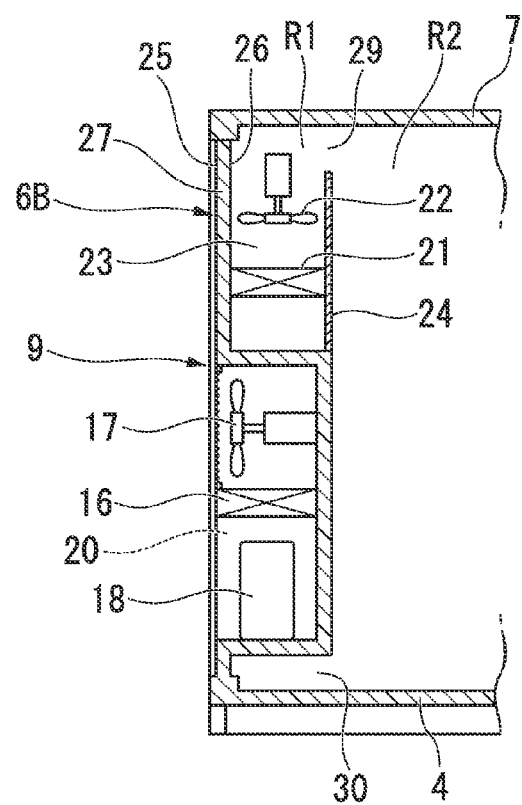
FIG. 2B is a longitudinal sectional view of a part of the reefer container taken along line X-X of the FIG. 1A.

As illustrated in FIGS. 2A and 2B, the cooling unit 9 includes: a container outside portion 20 having a compressor 15, a condenser 16, a condenser fan 17, a thermostat device (not shown) for controlling the temperature of a cargo chamber R2, and a secondary battery 18 which supplies power to the cooling unit 9 in a state where the power supply is stopped at the time of loading and unloading of the container 1; a container inside portion 23 including an evaporator 21 and an evaporator fan 22; the end wall 6B which divides the container outside portion 20 and the container inside portion 23; and a rear plate 24 which divides a space R1 in which the cooling unit 9 is installed and the cargo chamber R2.

The lower portion of the end wall 6B forms the container outside portion 20 which is a recessed place for storing the compressor 15, the condenser 16, the condenser fan 17, and the secondary battery 18. In addition, a space between the upper portion of the end wall 6B and the rear plate 24 is in the container inside portion 23 that stores the evaporator 21 and the evaporator fan 22.

The end wall 6B has an heat-insulated double-wall structure constituted by a container outside plate portion 25 that forms the outer wall surface, a container inside plate portion 26 that forms the inner wall surface, and an heat insulating material 27 filled between the container outside plate portion 25 and the container inside plate portion 26. In addition, a cold air passage (not shown) for inducing cold air from the container inside portion 23 to the bottom portion of the cargo chamber R2 is provided between the container inside plate portion 26 and the rear plate 24. In addition, a suction air passage 29 which introduces air in the cargo chamber R2 toward the container inside portion 23 is formed between the upper end of the rear plate 24 and the top plate 7. Moreover, a blow-off air passage 30 which introduces the cold air from the container inside portion 23 to the cargo chamber R2 via the cold air passage is formed between the lower portion of the end wall 6B and the bottom plate 4.

As illustrated in FIGS. 1A and 1B, opening portions 35 and 35 are respectively formed in the side walls 5A and 5B at positions close to the lower portion of the end wall 6B, and storage members 36 and 36 are fitted into the opening portions 35 and 35. A power receiving portion T is fixed to the storage member 36 of one side plate 5A, and a power supply portion S2 is fixed to the storage member 36 of the other side plate 5B. The storage member 36 is configured of a member such as a synthetic resin that forms an insulator, blocks conduction between the metallic side walls 5A and 5B and the end wall 6B so as not to adversely affect the power supply by the power supply system 3.

Next, the power supply system 3 will be described.

Figure 3:
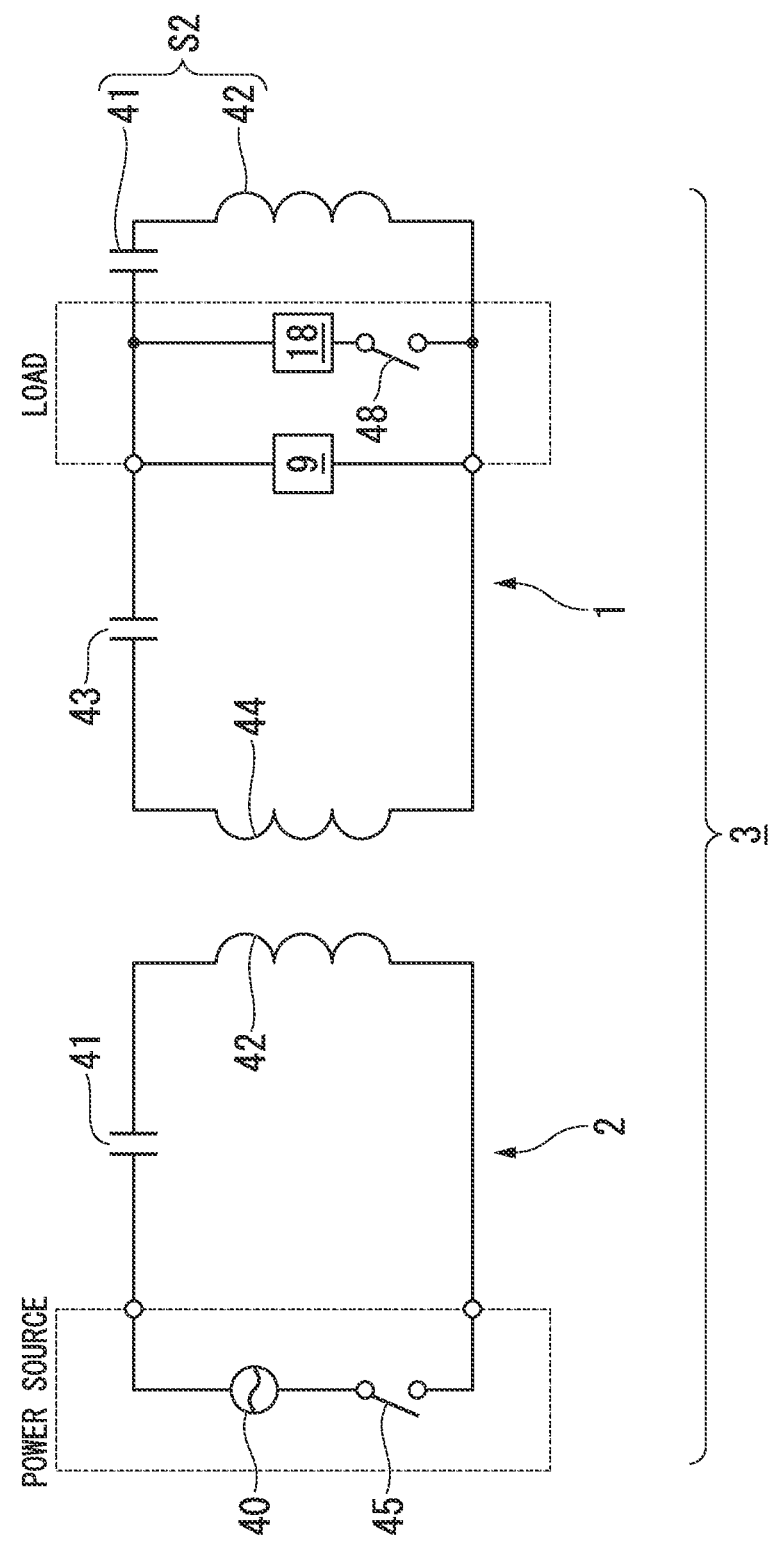
FIG. 3 is a circuit diagram of the power supply system.

As illustrated in FIG. 3, the power supply system 3 includes: an external power source 40 which outputs power at a predetermined frequency; the power supply portion S1 which is connected to the external power source 40 to receive power from the external power source 40 to supply power; the power receiving portion T which receives power from the power supply portion S1; the cooling unit 9 which is a load supplied with power from the power receiving portion T; and the secondary battery 18 which is connected to the power receiving portion T and temporarily stores power. A power supply method of the power supply system 3 employs a magnetic field resonance system in which power is supplied to the power receiving portion T from the power supply portion S1 by matching the resonant frequency of the power supply portion S1 to the resonant frequency of the power receiving portion T.

The power supply portion S1 includes a capacitor 41, and the sheet-shaped power supply coil 42 in which conductors are arranged on a plane. As illustrated in FIG. 4, the power supply coils 42 are arranged along the wall surface W1 that extends in the vertical direction.

As illustrated in FIG. 3, the power receiving portion T includes a capacitor 43, and a sheet-shaped power receiving coil 44 in which conductors are arranged on a plane. As illustrated in FIG. 4, the power receiving coils 44 are arranged along the side wall 5A, and supplies power received from the power supply coil 42 of the power supply portion S1 to the cooling unit 9 connected to the power receiving portion T. In addition, the power supply portion S2 which supplies the received power to the power receiving portion T of the other adjacent container 1 is connected to the power receiving portion T.

As illustrated in FIGS. 1A and 1B, the power supply portion S2 disposed in the side wall 5B of the container body 8 is provided at the place that opposes the power receiving portion T disposed in the side wall 5A, and has the same configuration as that of the power supply portion S1 of the power supply apparatus 2 except that the power supply source of the power supply portion S2 is the power receiving portion T.

As illustrated in FIG. 4, in a case where a plurality of the containers 1 are arranged so that the power receiving coil 44 opposes the power supply coil 42 positioned at the lowest position of the power supply apparatus 2 and on the container 1, the other containers 1 are stacked on four levels, the respective power receiving coils 44 of the four containers 1 oppose the four power supply coils 42 vertically provided in the power supply apparatus 2.

Next, the power supply method of the container 1 will be described.

First, as described above, as illustrated in FIGS. 1A and 4, the container 1 at the lowest level is disposed so that the power receiving coil 44 of the container 1 at the lowest level opposes the power supply coil 42 positioned at the lowest position of the power supply apparatus 2, and on the container 1, three other containers 1, 1, and 1 having the same shape are vertically stacked so that the four corners of the four container 1 are aligned with each other. As a result, the respective power receiving coils 44 of the containers 1 are arranged to oppose the power supply coils 42 that are installed in the power supply apparatus 2 at predetermined intervals. In addition, the other containers 1 are stacked in the same direction as that of the stacked containers 1 to be adjacent to one another, and the power supply coil 42 and the power receiving coil 44 of the adjacent containers 1 are caused to oppose each other. By causing the containers 1 stacked in this manner to be adjacent to one another in a plurality of rows, all the containers 1 are in a state of being supplied with power.

After stacking the containers 1 as described above, when a switch 45 of the power supply apparatus 2 illustrated in FIG. 3 is turned on, power is supplied from each of the power supply portions S1 of the power supply apparatus 2 to the power receiving portion T of the container 1 disposed to be closest (adjacent) to the power supply apparatus 2, and power is supplied to the cooling unit 9, the secondary battery 18, and the power supply coil S2 which are connected to the power receiving portion T. Furthermore, the supplied power is supplied from the power supply coil 42 of the power supply portion S2 disposed in the container body 8 to the power receiving coils 44 of the stacked containers 1 right adjacent to the container 1, and in the same manner, the power is sequentially supplied to the containers 1 adjacent to one another.

That is, in a case of the stacking illustrated in FIG. 4, among the three containers 1 that constitute the lowest level, first, the container 1 disposed on the left in FIG. 4 is supplied with power from the power supply coil 42 at the lowest position of the power supply apparatus 2. Subsequently, the power is supplied from the container 1 on the left in FIG. 4 to the container 1 at the center in FIG. 4. Last, the power is supplied from the container 1 at the center in FIG. 4 to the container 1 on the right in FIG. 4.

Similarly, among the three containers 1 that constitute the second level, first, the container 1 disposed on the left in FIG. 4 is supplied with power from the power supply coil 42 at the second position from the bottom of the power supply apparatus 2. Subsequently, the power is supplied from the container 1 on the left in FIG. 4 to the container 1 at the center in FIG. 4. Last, the power is supplied from the container 1 at the center in FIG. 4 to the container 1 on the right in FIG. 4. To the containers 1 at the third and fourth levels, the power is also supplied through the same flow.

In a case where the secondary battery 18 is also charged during the power supply, a switch 48 illustrated in FIG. 3 is turned on, and the switch 48 is turned off when the charging is completed. In this manner, in a state where power supply from the power supply apparatus 2 is stopped, for example, during loading and unloading of the container 1, when the switch 48 is turned on again, the power can be supplied from the secondary battery 18 to the cooling unit 9.

As described above, according to the power supply system 3 of the power supply apparatus 2 and the container 1, the plurality of the containers 1 can be simultaneously supplied with power only by being disposed adjacent to the containers 1 stacked at predetermined positions from the power supply apparatus 2. Therefore, according to the power supply system 3 including the container 1, there is no need to connect the power supply apparatus 2 to the power receiving portion T of each of the containers 1 with the power cable, and an operation of electrically connecting the power supply apparatus 2 and a number of containers 1 can be significantly reduced. Therefore, power supply can be simply prepared.

In addition, since the operational process of connecting the power supply portion S1 of the power supply apparatus 2 to the power receiving portion T of the container 1 with the power cable can be omitted, a time for which power supply is stopped during the operation of connecting the power cable until the power supply is started can be significantly reduced, and labor costs for connecting the power cable can be reduced.

In addition, since contactless power supply is possible, the power can be easily supplied even in a case where the containers 1 are stacked on two or more levels. Therefore, it is easy to supply power by stacking the containers 1 on a number of levels, and thus loading efficiency and power supply efficiency are enhanced during power supply to the containers 1.

In addition, the containers 1 can be efficiently loaded on the deck (not shown) of the container ship by stacking the containers 1 on two or more levels, and thus placement of the containers 1 in the hold can be avoided as much as possible. Therefore, an increase in the temperature in the hold due to the containers 1 is suppressed, and cooling cost of the container ship can be reduced.

In addition, when the plurality of the containers 1 and 1 are arranged to be horizontally adjacent, since the power supply portion S2 which supplies the power received by the container 1 to the power receiving portion T of the other adjacent container 1 is provided, the power can be simply supplied to the other adjacent containers 1 via the corresponding containers 1, and the power supply efficiency can be enhanced by increasing the number of containers 1 simultaneously supplied with the power.

In addition, since the power supply system 3 of this embodiment employs the magnetic field resonance system, the distance between the power supply coil 42 of the power supply apparatus 2 and the power receiving coil 44 of the container 1 or the distance between the power supply coil 42 of the power supply portion S2 and the power receiving coil 44 of the adjacent containers 1 can be lengthened. Therefore, even when a slight positional shift between the power supply coil 42 and the power receiving coil 44 occurs, the power supply is possible in a state where power loss is suppressed to be low. As a result, disposition accuracy required for the containers 1 is reduced, and the disposition of each of the containers 1 is facilitated.

While the container 1 and the power supply system 3 for the container 1 of this embodiment have been described above, the main points of the container 1 and the power supply system 3 are summarized as follows.

The container 1 according to this embodiment includes: the box-shaped container body 8; the cooling unit 9 which is the load equipped in the container body 8 and maintains the inside of the container body 8 at a refrigerating or freezing temperature, and the power receiving portion T which receives power supplied from the outside such as the power supply apparatus 2 and supplies the power to the cooling unit 9 (electrical load). In addition, the power receiving portion T includes the power receiving coil 44 which contactlessly receives the power from the aforementioned outside.

Moreover, the container body 8 described above includes: the rectangular bottom plate 4; the side plates 5A, 5B, 6A, and 6B which stand on the bottom plate 4 and surround the four sides of the bottom plate 4; and the top plate 7 which blocks the upper end opening portion formed at the upper edges of the side plates 5A, 513, 6A, and 611 The power receiving portion T is provided in the side plate 5A.

Furthermore, the container body 8 further includes the power supply portion S2 which supplies the power received by the container body 8 to the power receiving portion T of the other adjacent container bodies 8 when the plurality of the containers bodies 8 are arranged to be horizontally adjacent.

In addition, the power supply system 3 for the container 1 in the embodiment includes: the container 1; and the power supply apparatus 2 which has the power supply portion contactlessly supplying power to the container 1.

In addition, in the above-described embodiment, as illustrated in FIG. 4, wireless power supply, which uses the magnetic field resonance system, from the power supply apparatus 2 to each of the four containers 1 shown on the left in FIG. 4 is achieved; however, the embodiment is not limited thereto. For example, wired power supply, which uses the power cable (not shown), from the power supply apparatus 2 to only each of the four containers 1 adjacent to the power supply apparatus 2 and stacked on the left in FIG. 4 may be achieved. Here, even in this case, wireless power supply, which uses the magnetic field resonance system, between the containers 1 adjacent to each other on the left and on the right is achieved.

Next, Modification Examples 1 to 4 of the above-described power supply system 3 will be described. In addition, in each of the modification examples, only differences from the power supply system 3 of the embodiment will be described, and since the other configurations are the same as those described in the above embodiment, descriptions of the other configurations will be omitted.

MODIFICATION EXAMPLE 1

Figure 5:
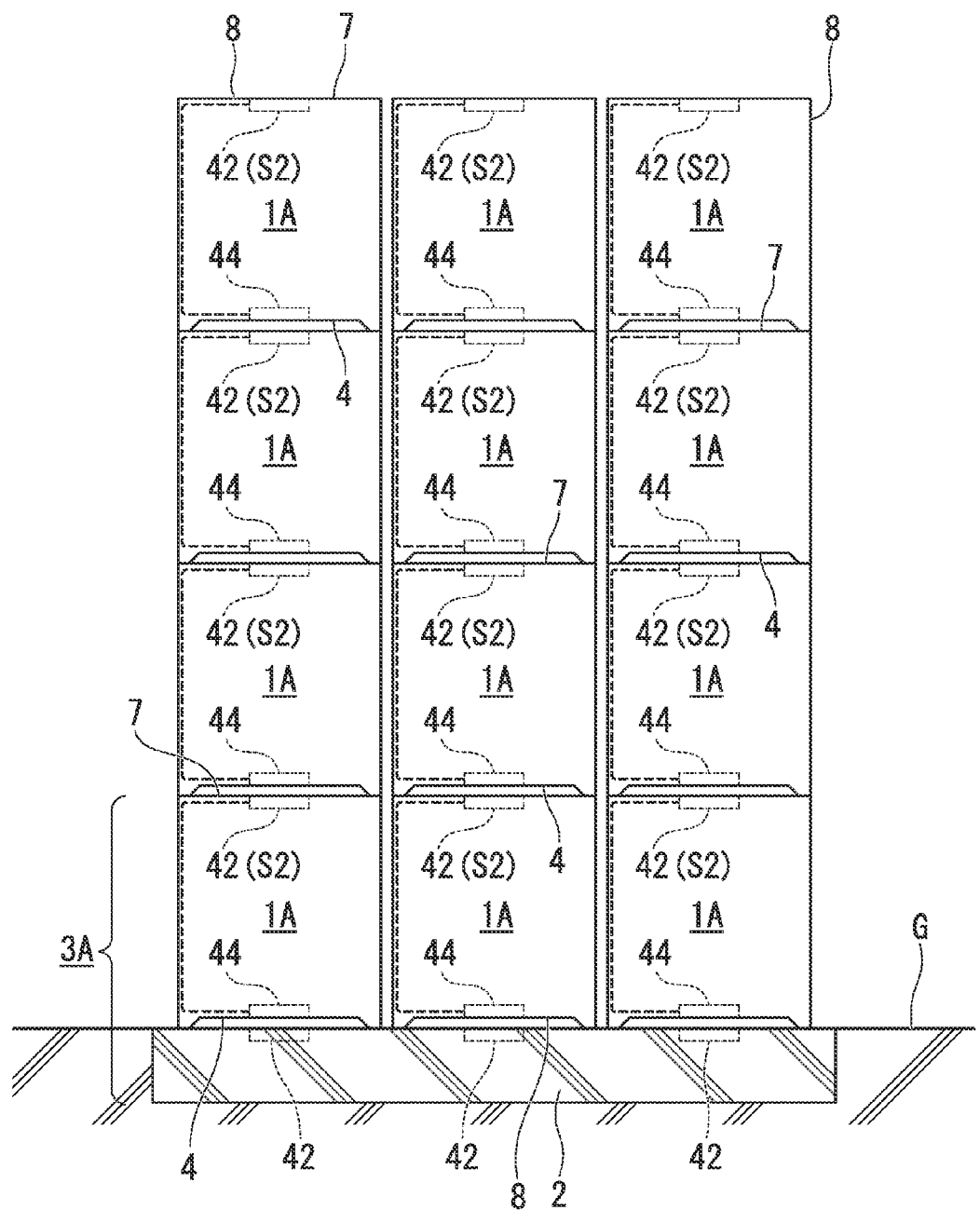
FIG. 5 is a figure illustrating a modification example of the power supply system and is a side view of the power supply apparatus provided on the ground surface and the reefer containers stacked.

As illustrated in FIG. 5, in a power supply system 3A of Modification Example 1, the installation position of the power supply apparatus 2 and the arrangement of the power receiving portion T and the power supply portion S2 provided in each of containers 1A are different from those of the container 1 described above.

In the power supply system 3 according to the embodiment, as illustrated in FIG. 4, the configuration in which the power supply coils 42 are vertically arranged along the wall body in which the power supply apparatus 2 stands on the ground surface G, the power receiving coil 44 disposed in each of the containers 1 is provided in the side wall 5A to oppose the power supply coil 42 of the power supply apparatus 2, and the power supply portion S2 of each of the containers 1 is provided in the side wall 5B of the container 1 to oppose the power receiving portion T of the other adjacent container 1 is employed.

On the other hand, as illustrated in FIG. 5, in the container 1A of Modification Example 1, the power supply coils 42 of the power supply apparatus 2 are arranged along the ground surface (arranged to flush with the ground surface), and the capacitor 41 illustrated in FIG. 3 is provided in the ground. In addition, the power receiving coils 44 of the containers 1A are arranged along the bottom plate 4 to oppose the power supply coils 42 arranged along the ground surface in the same configuration as the above embodiment. Furthermore, in the stacking direction of the containers 1, the power supply coil 42 is provided at a predetermined position of the top plate 7 so that the power supply coil 42 of the power supply portion S2 of the container 1A at the lower level opposes the power receiving coil 44 provided in the bottom plate 4 of the container 1A at the upper level.

By configuring the power supply system 3A as described above, the container 1A can be simply supplied with power only by placing the container 1A flat at the position where the power supply apparatus 2 is provided in the container terminal or the container ship and disposing the power receiving coil 44 to oppose the power supply coil 42.

In addition, since the power supply portion S2 is provided in the top plate 7 of the container 1A, power supply from the lower container 1A to the upper container 1A can be achieved only by stacking the containers 1A, and thus power can be simply and efficiently supplied to a number of containers 1A and 1A at the same time.

As described above, in the container 1A of the modification example 1, when the plurality of the container bodies 8 are vertically stacked, the power supply portion S2 which supplies the power received by the container body 8 to the power receiving coil 44 of the power receiving portion T of the other container body 8 stacked on itself by the power supply coil 42 is provided in the top plate 7.

In addition, in the modification described above, as illustrated in FIG. 5, the wireless power supply is performed using the magnetic field resonance system for each of the three containers 1A at the lowest level from the power supply apparatus 2, but this is not limited thereto. For example, wired power supply, which uses the power cable (not shown), from the power supply apparatus 2 to only the three containers 1 directly stacked on the power supply apparatus 2 may be achieved. Here, even in this case, wireless power supply, which uses the magnetic field resonance system, between the containers 1 vertically adjacent to each other is achieved.

MODIFICATION EXAMPLE 2

A power supply system of Modification Example 2 is provided with, although not shown in the figure, a power receiving connection portion to which the power cable is connected with a plug from the outside to supply power from the outside, in addition to the power receiving portion T and the power supply portions 2 provided in the container 1 described in the embodiment or the container 1A described in Modification Example 1. In the container 1 or the container 1A, contactless power supply and power supply by connection of the power cable can be selectively used.

In this configuration, even in a case where any of the contactless power supply systems and the connections of the power cable are malfunctioned, power can be supplied by switching to the other power supply system. Therefore, a problem in which power cannot be supplied to the other containers 1 or 1A when one of the plurality of the containers 1 or 1A is malfunctioned can be avoided.

MODIFICATION EXAMPLE 3

A power supply system of Modification Example 3 employs, although not shown in the figure, power supply which uses an electromagnetic induction system in which the resonant frequencies of the power supply portions S1 and S2 and the resonant frequency of the power receiving portion T are not matched.

According to the contactless power supply which uses the electromagnetic induction system in which the resonant frequencies of the power supply portions S1 and S2 and the resonant frequency of the power receiving portion T are not matched, the power can be supplied by allowing a certain degree of difference between the resonant frequencies. Here, the distance between the power supply coil 42 and the power receiving coil 44 needs to be reduced as much as possible to cause the power supply coil 42 and the power receiving coil 44 to be accurately positioned. However, each of the containers 1 has the configuration in which the containers 1 having the same dimensions are overlapped and stacked so that the four sides of the upper and lower containers 1 and 1 are aligned. Therefore, when the installation positions of the power receiving coil 44 and the power supply coil 42 in the container 1 are appropriately determined, only by stacking the containers 1 in a typical manner, the power receiving coil 44 of one container 1 and the power supply coil 42 of the other container 1 can accurately oppose each other and come close to each other. Therefore, even in the power supply which uses the electromagnetic induction system, the power supply loss can be suppressed.

MODIFICATION EXAMPLE 4

In a power supply system of Modification Example 4, by combining the container 1 of the embodiment illustrated in FIG. 4 with the container 1A of Modification Example 1 illustrated in FIG. 5, the power receiving coil 44 and the power supply coil 42 are respectively provided in the side walls 5A and 5B of the container 1 (1A), and the power receiving coil 44 and the power supply coil 42 are respectively provided in the bottom plate 4 and the top plate 7. That is, the power receiving portions T may be provided in both the side plate 5A or 5B and the bottom plate 4 or the top plate 7. Similarly, the power supply portions S2 connected to the power receiving portion T of the power supply portion S2 may be provided in both the side plate 5A or 513 and the bottom plate 4 or the top plate 7 to be disposed at a position opposing the power receiving portion T of the other container 1 (1A).

In this configuration, the power receiving portion T and the power supply portion S2 which supply power to the container 1 (1A) can be selectively switched to correspond to the disposition (disposition in the wall surface or disposition in the ground surface) of the power supply portion S1 of the power supply apparatus 2.

In addition, the power supply coil 42 and the power receiving coil 44 of the power supply system 3 described in the embodiment and Modification Examples 1 to 4 employ the coils formed by disposing the conductors on a plane in the shape of a sheet, but may also employ coils formed by disposing conductors around a center axis line in a spiral shape.

In addition, the power supply system 3 described in the embodiment and Modification Examples 1 to 4 has the configuration in which the secondary battery 18 is included, but the equipment of the secondary battery 18 may also be omitted.

Figure 6:
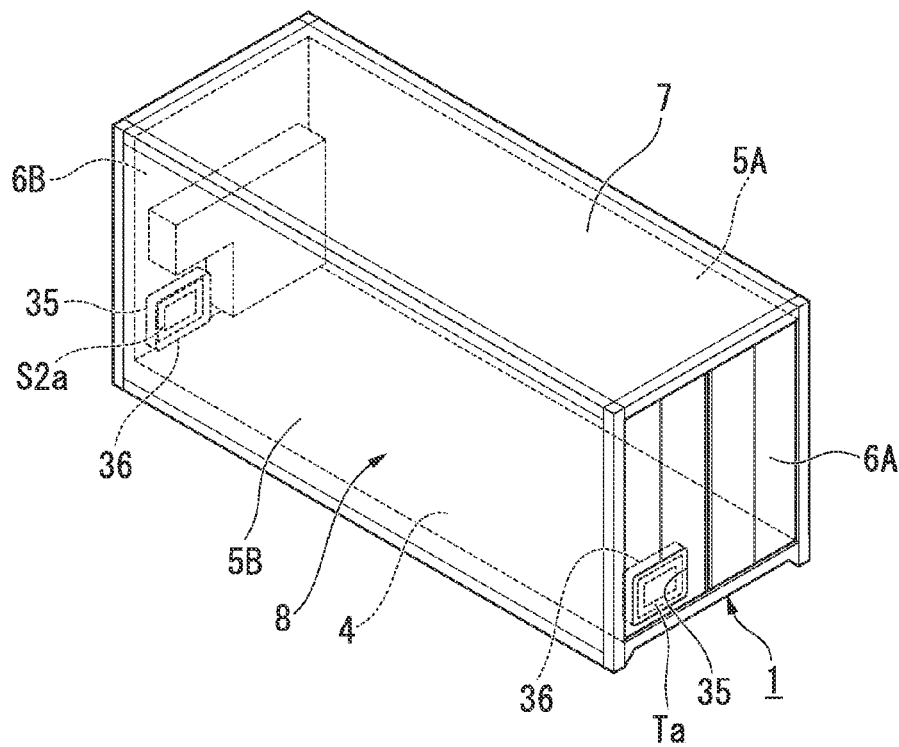
FIG. 6 is a perspective view of a reefer container according to another modification example of the power supply system.

In addition, the embodiment 1 and Modification Examples 1 to 4 have the configuration in which the power receiving portion T and the power supply portion S2 provided in the container body 8 are provided to respectively oppose the side walls 5A and 5B or the bottom plate 4 and the top plate 7, but is not limited to the configuration. For example, as illustrated in FIG. 6, a power receiving portion Ta and a power supply portion S2a may be provided to oppose the end walls 6A and 6B.

In addition, in the embodiment, the power supply apparatus 2 provided in the side wall portion of the container ship, a building, or the like is configured to supply power by stacking the containers 1 on four levels. However, the number and arrangement of power supply portion S1 may be appropriately changed so that power can be supplied when the containers 1 are stacked on two levels, three levels, or five or more levels.

Figure 7:
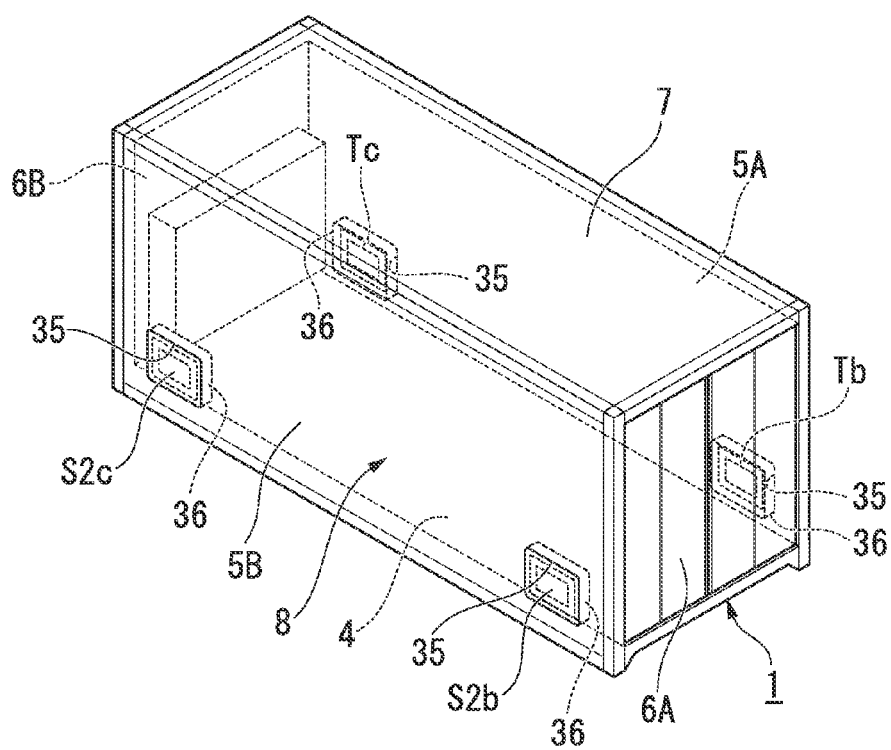
FIG. 7 is a perspective view of a reefer container according to further another modification example of the power supply system.

In addition, a plurality of pairs of power receiving portions and power supply portions may be provided in the side plates 5A and 5B of the container 1. That is, for example, as illustrated in FIG. 7, like power receiving portions Tb and Tc and power supply portions S2b and S2c connected to receiving portions Tb and Tc and disposed to oppose, two pairs of the power receiving portion and the power supply portion may be provided in the side plates 5A and 5B. Similarly, even in the bottom plate 4 and the top plate 7, a plurality of pairs (two or more pairs) of the power receiving portion T and the power supply portion S2 connected to receiving portion T and disposed to oppose the power receiving portion T of the other container 1 may also be provided.

In addition, the load connected to the power receiving portion T is not limited to the cooling unit 9, but may also be a temperature controller of a thermal container or the other load apparatus that are operated using power.

INDUSTRIAL APPLICABILITY

According to the present invention, it is possible to provide a reefer container which enables a simple and efficient power supply operation and can be applied to stacking on multiple levels, and the power supply system for the reefer container.

DESCRIPTION OF THE REFERENCE SYMBOLS

1, 1A container (reefer container)
2 power supply apparatus
3 power supply system
5 bottom plate
5A, 5B side wall (side plate)
6A, 6B end wall (side plate)
7 top plate
8 container body
9 load (cooling unit)
42 power supply coil

44 power receiving coil
T power receiving portion
S1, S2 power supply portion

The invention claimed is:

1. A reefer container comprising:
a rectangular cuboid container body being formed from a plurality of plates including a first plate and a second plate;
a load equipped in the container body;
a power receiving portion which is configured to receive power from an outside and to supply the power to the load, the power receiving portion being provided on the first plate; and
a power supply portion being provided at a position that opposes the power receiving portion and connected to the power receiving portion via the load, the power supply portion being provided on the second plate, wherein
the power receiving portion comprises a power receiving coil which is configured to contactlessly receive the power from the outside,
the first plate is positioned to face the second plate,
the plurality of plates comprises a rectangular bottom plate, side plates which stand on the bottom plate an surround four sides of the bottom plate, and a top plate which blocks an upper end opening formed by the side plates,
the first plate is one of the side plates, and
the power supply portion is configured to supply power received by the container body to the power receiving portion of another adjacent container body when a plurality of the container bodies are arranged to be horizontally adjacent.

2. The reefer container according to claim 1, wherein
the power receiving portion is provided in both the first plate and a third plate,
the power supply portion is provided in both the second plate and a fourth plate,
the third plate is positioned to face the fourth plate, and
the third plate is the bottom plate.

3. The reefer container according to claim 2, wherein
the second plate is one of the side plates and the fourth plate is the top plate.

4. The reefer container according to claim 1,
further comprising: a power receiving connection portion to which a power cable which is configured to supply the power from the outside is connected.

5. A power supply system for a reefer container comprising:
the reefer container according to claim 1; and
a main power supply apparatus which is configured to contactlessly supply power to the reefer container.

6. The power supply system according to claim 5, wherein
a power supply coil of the power supply portion is sheet-shaped.

7. A reefer container comprising:
a rectangular cuboid container body being formed from a plurality of plates including a first plate and a second plate;
a load equipped in the container body;
a power receiving portion which is configured to receive power from an outside and to supply the power to the load, the power receiving portion being provided on the first plate; and
a power supply portion being provided at a position that opposes the power receiving portion and connected to the power receiving portion via the load, the power supply portion being provided on the second plate, wherein the power receiving portion comprises a power receiving coil which is configured to contactlessly receive the power from the outside, the first plate is positioned to face the second plate, the plurality of plates comprises a rectangular bottom plate, side plates which stand on the bottom plate and surround four sides of the bottom plate, and a top plate which is disposed at an upper end opening formed by the side plates, the first plate is the bottom plate, and the power supply portion is configured to supply power received by the container body to the power receiving portion of another container body stacked on the container body when a plurality of the container bodies are vertically stacked.

8. The reefer container according to claim 7, wherein the power receiving portion is provided in both the first plate and a third plate, the power supply portion is provided in both the second plate and a fourth plate, the third plate is positioned to face the fourth plate, and the third plate is one of side plates.

9. The reefer container according to claim 8, wherein the second plate is the top plate and the fourth plate is one of the side plates.

10. The reefer container according to claim 7, further comprising: a power receiving connection portion to which a power cable which is configured to supply the power from the outside is connected.

11. The reefer container according to claim 7, wherein a power supply system of the power receiving portion is an electromagnetic induction system.

12. The reefer container according to claim 7, wherein a power supply system of the power receiving portion is a magnetic field resonance system.

13. A power supply system for a reefer container comprising:

the reefer container according to claim 7; and a main power supply apparatus which is configured to contactlessly supply power to the reefer container.

14. The power supply system according to claim 13, wherein a power supply coil of the power supply portion is sheet-shaped.

* * * * *